C. M. BRANDT.
BIRD CAGE GUARD.
APPLICATION FILED NOV. 3, 1913.

1,094,423.

Patented Apr. 28, 1914.

Witnesses

Inventor:
Charles M. Brandt
By
his Attorney

UNITED STATES PATENT OFFICE.

CHARLES MAISON BRANDT, OF PHILADELPHIA, PENNSYLVANIA, ASSIGNOR TO JOHN T. WILLIAMS, OF PHILADELPHIA, PENNSYLVANIA.

BIRD-CAGE GUARD.

1,094,423.   Specification of Letters Patent.   Patented Apr. 28, 1914.

Application filed November 3, 1913. Serial No. 798,949.

*To all whom it may concern:*

Be it known that I, CHARLES M. BRANDT, a citizen of the United States, residing at Philadelphia, in the county of Philadelphia and State of Pennsylvania, have invented certain new and useful Improvements in Bird-Cage Guards, of which the following is a specification.

This invention relates to bird cage guards, designed for the purpose of preventing seed and water from being discharged from the cage by the bird to litter up the floor and spatter the wall of the room in which the bird is kept, and one of the principal objects of the invention is to provide simple and reliable means for holding the guard adjustably upon a cage and for partially surrounding the same to catch the seed and water thrown out by the bird, thus saving the seed to be replaced in the cage when ever desired.

Another object of the invention is to provide a bird cage guard which can be extended to be used on various sizes of bird cages and which can be adjusted up or down upon the cage to cover the bottom of the cage and a portion of the sides thereof, so that the seeds will be caught and deposited in a pocket at the lower portion of the netting designed for quick discharge into a receptacle to be again placed in the cage for use.

These and other objects may be attained by means of the construction illustrated in the accompanying drawing, in which,—

Figure 1:
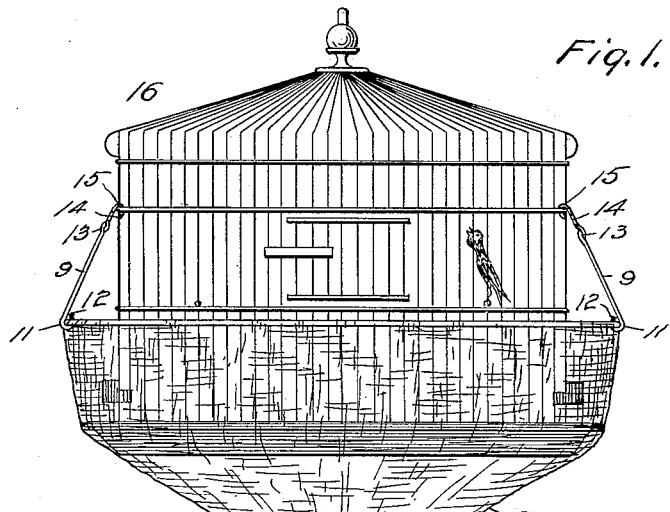
Figure 2:
Figure 3:
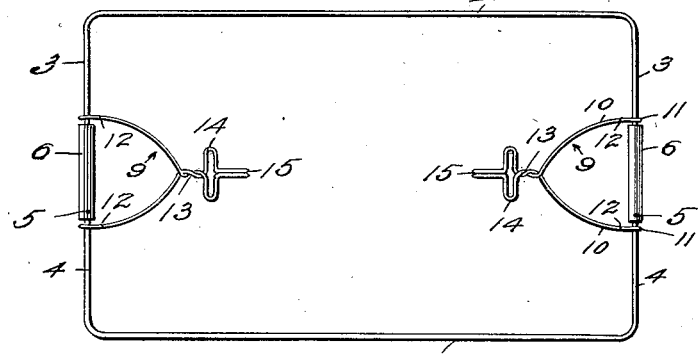

Figure 1 is a side elevation of a bird cage having a guard connected thereto made in accordance with this invention. Fig. 2 is a top plan view of the bird cage guard separated from the cage. Fig. 3 is a detailed sectional view showing the manner of adjusting the guard to different sizes of cages.

Referring to the drawing the numeral 1 designates one member of the guard and 2 is the other member thereof, those two members being separately formed of wire of the proper gage and bent at right angles to form the telescopic members 3 and 4, said member 4 being rigidly connected at 5 to a piece of tubing 6 in which the ends of the members 3 may be readily adjusted to make the frame conform to the size of the cage to which it is to be attached. Connected to this frame is a piece of netting, tarleton or other suitable fabric, which is brought together and tied with the bow 8 at the bottom thereof.

The supporting members 9, each comprise the two members 10 each provided with a hook 11 adapted to engage the end members 3 and 4 of the frame, said hooks having bent terminals 12, so that they can be readily disconnected from the members 3 and 4 whenever it is desired. The separated legs on members 10 are twisted together at 13 and provided with the oppositely extending fingers 14 and the strands of wire continued to form the hook 15. These two supporting members are pivotally connected to the members 3 and 4, and these can be supported upon any of the transverse wires of the cage 16. The entire guard may be adjusted up or down on the cage as required.

From the foregoing it will be obvious that the bird seeds scattered from the cage will drop into the pocket *a* at the lower portion of the fabric netting 7, and that the seed may readily be removed by untying the bow 8. It will also be apparent that water flirted or scattered from the bird's bath will not be splashed upon the wall or floor, and that the device as a whole can be made cheaply, quickly connected to a bird cage, and will prevent seed and water from being thrown out of the cage on to the wall or floor.

What is claimed is:

The herein described bird cage guard comprising a rectangular frame composed of two wire members, one of said members having a tubular extension secured to each of its opposite ends permanently, to permit adjustment and separation of the other member therefrom, supporting members each comprising spaced legs pivotally connected to said frame, said legs being brought together and twisted and hooks formed on said supporting members to engage the wire of the bird cage, said supporting members having oppositely extending fingers adjacent the hooks, and a netting connected to said frame and provided with a pocket to catch the seed thrown from the cage.

In testimony whereof I have affixed my signature in presence of two witnesses.

CHARLES MAISON BRANDT.

Witnesses:
ROLLO CANAVAN,
MARIAN P. BRANDT.

Copies of this patent may be obtained for five cents each, by addressing the "Commissioner of Patents, Washington, D. C."